United States Patent [19]
Mikami et al.

[11] Patent Number: 5,489,423
[45] Date of Patent: Feb. 6, 1996

[54] PROCESS FOR RECOVERING SULFURIC ACID FROM METALLIC SULFATE-CONTAINING EXHAUST SULFURIC ACID

[75] Inventors: Yasuie Mikami, Tokyo; Nobuyoshi Iyatomi, Mitaka, both of Japan

[73] Assignee: Nittetsu Mining Co., Ltd., Tokyo, Japan

[21] Appl. No.: 968,099

[22] Filed: Oct. 29, 1992

[30] Foreign Application Priority Data

Nov. 8, 1991 [JP] Japan .................................. 3-293126

[51] Int. Cl.⁶ ............................ C01B 17/69; C01B 17/90
[52] U.S. Cl. ............................ 423/531; 423/522; 423/83; 423/DIG. 2
[58] Field of Search ....................... 423/DIG. 1, DIG. 2, 423/527, 531, 522, 84, 83

[56] References Cited

U.S. PATENT DOCUMENTS

| | | | |
|---|---|---|---|
| 3,635,664 | 1/1972 | Morimoto | 23/126 |
| 4,177,119 | 12/1979 | Watanabe et al. | 204/151 |
| 4,261,959 | 4/1981 | Kim et al. | 423/139 |
| 5,061,472 | 10/1991 | Lailach et al. | 423/531 |

FOREIGN PATENT DOCUMENTS

| | | |
|---|---|---|
| 0298763 | 1/1989 | European Pat. Off. |
| 0301700 | 2/1989 | European Pat. Off. |
| 4026446 | 2/1991 | Germany |
| 46-5568 | 2/1971 | Japan |
| 2-129010 | 5/1990 | Japan |
| 3-88718 | 4/1991 | Japan |
| 3-80103 | 4/1991 | Japan |

OTHER PUBLICATIONS

Patent Abstract of Japan, vol. 15, No. 259 (C-846) 2 Jul. 1991 and JP-A-30 88 718 (Sanehisa Kodama) 15 Apr. 1991.
Hydrometallurgy, 12(1984), "Iron (III) Removal From Base-Metal Jul. 1984 Electrolyte Solutions by Solvent Extraction", Demopoulos et al, pp. 299–315.
Fine Particles & Powder Metallurgy, vol. 36, No. 3, "Production of Highly Pure Oxide Using a Solvent Extraction Method", Chiba et al., pp. 35–42; proceedings ICF-5 (1989) India Mar.
Conservation & Recycling, vol. 10, No. 4, 1987, "Recovery of Ferrous Sulfate and Sulfuric Acid From Spent Pickle Liquor of the Steel Industry", Niecko, pp. 309–314 Apr.
Sulphur No. 207, Mar.–Apr. 1990, "Reprocessing Spent Sulfuric Acid", Al Samadi et al, pp. 43, 45, 47, 49–50.
Process Ind Can, vol. 71, No. 4, Apr. 1987, "Reuse of Waste Ferrous Sulphate Cuprous Chloride Electrolyte", Pawlowski et al, pp. 521–529.
Chemical Engineering, vol. 93, No. 3, Feb. 3; 1986, "Acid Recovery Cuts Waste Output", Smith et al, pp. 44–45.
Chemical Engineering, vol. 89, No. 8, Apr. 19, 1982, "Process Gives New Life to Contaminated Sulfuric Acid", Kueng et al, pp. 72–73.

*Primary Examiner*—Gary P. Straub
*Assistant Examiner*—Timothy C. Vanoy
*Attorney, Agent, or Firm*—Jordan and Hamburg

[57] ABSTRACT

In order to efficiently and easily recover a spent sulfuric acid exhasuted, for example, in an acid washing liquid or in producing titanium dioxide by a sulfate method in a large amount, as highly concentrated sulfuric acid, bivalent iron ions in the spent sulfuric acid containing metal sulfate are first oxidized into trivalent iron ions, hydrochloric acid is added to such a liquid and then solvent extraction is carried out.

6 Claims, 2 Drawing Sheets

HCℓ CONCENTRATION IN
EXHAUST SULFURIC ACID (N)

PROCESS FOR RECOVERING SULFURIC ACID FROM METALLIC SULFATE-CONTAINING EXHAUST SULFURIC ACID

BACKGROUND OF THE INVENTION

This invention relates to a process for recycling a spent sulfuric acid, for example, exhausted from the stage of producing titanium dioxide, by regeneration.

Titanium dioxide has been used in a large quantity as a white pigment in paint industries and as a coloring material in various fields. As a process for producing titanium dioxide, a so-called "sulfate process" is most commonly known. In this process, ilmenite or titanium slag is milled into particles with particle sizes of not more than 200 mesh sieve pass, and then treated with concentrated sulfuric acid to give titanium sulfate solution. While adjusting the concentration by the addition of water or dilute sulfuric acid, scrap iron is added thereto in order to prevent the precipitation of iron ions contained as impurities, thereby reducing trivalent iron ions to bivalent iron ions. This is followed by allowing the solution to cool, to separate out ferrous sulfate. After removal of the separated substances, hydrolysis of the titanium sulfate solution gives titanium hydroxide, which is then filtered, washed, and finally calcinated to obtain titanium dioxide.

In these stages for producing titanium dioxide, a large quantity of spent sulfuric acid is chiefly exhausted in the stage of separation between the solid and liquid in titanium hydroxide. Conventionally, concerning the treatment Process for the spent sulfuric acid, it was buried as gypsum or neutralized and then thrown out to the ocean. However, environmental problems have recently been given a great deal of attention. Moreover, problems of securing a site to be filled up with the gypsum, and of expensive treatment costs have arisen. How to deal with them is important.

In order to deal with these problems, processes for recovering sulfuric acid from the spent sulfuric acid by separating of impurities from spent sulfuric acid have been suggested. For example, a process in which the spent sulfuric acid is concentrated as it is (Japanese Patent Publication Sho 46-5568, etc.) and a process in which the spent sulfuric acid is treated in a combination of a vacuum crystallization stage and a concentration stage are mentioned. Due to the deposition of a large quantity of metal sulfates, these process are, however, problematic in that a desired highly concentrated sulfuric acid cannot be obtained.

More recently, Japanese Patent Laid-Open Hei 3-80103 and Hei 3-88718 disclose processes for removing impurities with a solvent extraction method. Nevertheless, since a strongly acidic sulfuric acid solution is treated by means of a solvent extraction as it is in these processes, the actual efficiency for extracting iron ions is not high as described in these patent applications. Moreover, the iron content thus recovered has low purity. Furthermore, these applications suggest the recovery of iron ions using methyl isobutyl ketone, but it is impossible to directly extract trivalent iron ion with a neutral extracting agent, such as methyl isobutyl ketone, in which case the iron is extracted as a complex such as a chloride complex. Also, in the case where an acidic extracting agent is utilized in order to directly extract trivalent iron ions from the sulfuric acid solution, multi-stage extraction is necessarily involved due to its low extraction ratio.

SUMMARY OF THE INVENTION

An object of the present invention is to solve the above-mentioned problems and to provide a process for regenerating highly concentrated sulfuric acid from a spent sulfuric acid containing metal sulfates which is discharged in a large quantity, for example, from a spent liquid of acid washing or in the case of producing titanium dioxide by the sulfuric acid method.

Another object of the present invention is to attain the prevention of environmental pollution by effectively recovering a highly concentrated sulfuric acid from a spent sulfuric acid containing metal sulfates in a closed system.

Still another object of the present invention is to designate an available utilization of resource by recovering iron, titanium, etc. as by-products.

In order to solve these objects, the present invention suggests the oxidization of bivalent iron ions in a spent sulfuric acid containing metal sulfates to trivalent iron ions followed by addition of hydrochloric acid to such a liquid and solvent extraction.

In particular, the regeneration of a spent sulfuric acid is suggested by the present invention, which comprises a step for oxidizing bivalent iron ions in a spent sulfuric acid containing metal sulfates to trivalent iron ions; a step for adding hydrochloric acid to the liquid so that a molar fraction of chlorine ion in the liquid is adjusted to at least 4 times that of iron ions; a step for subjecting solvent extraction of the liquid to remove impure metal ions such as iron ions; a step for concentrating the solution after solvent extraction to a sulfuric acid concentration of 60–75% by weight to recover hydrochloric acid; a step for separating metal sulfates deposited at this time; and a step for concentrating the separated solution again to a sulfuric concentration of not less than 80% by weight.

The basic conception of the process for regenerating spent sulfuric acid containing metal sulfates according to the present invention is to effectively remove main impure metal ions, such as iron, titanium, and manganese, contained in the spent sulfuric acid and to concentrate the solution to regenerate it into a highly concentrated sulfuric acid.

In the impure metal ions, iron ions exist in a large amount as bivalent ions particularly. The removal of the bivalent iron ions is essential for effective regeneration of the spent sulfuric acid. However, since the removal of the bivalent iron ions directly by solvent extraction treatment can be carried out only with great difficulty, the bivalent iron ions are first oxidized to the trivalent iron ions, and the trivalent iron ions are then removed by solvent extraction treatment. At this time, hydrochloric acid is added to the spent sulfuric acid to substitute the metal sulfates with chlorine ions, thereby giving an iron chloride complex, after which the solvent extraction is carried out. It has been found that such a procedure can extract more than 99% of the iron ions, the extraction being more effective than the solvent extraction where the spent sulfuric acid is extracted as it is.

It has been also found that iron ions and titanium ions can be individually separated when a plurality of extracting agents are used in the solvent extraction treatment.

In the present invention, as the method for oxidizing the divalent iron ions in the spent sulfuric acid, either a usual oxidation with chlorine or an oxidation by electrolysis may be used. Furthermore, an oxidation with air may also be utilized. In this oxidization step, for example, in the case of the oxidation with chlorine, the following reaction takes place by blowing a chlorine gas into the spent sulfuric acid in a stoichiometric or excess amount relative to the divalent iron ions contained in the spent sulfuric acid, thereby oxidizing 99% or more of the bivalent iron ions with ease.

$$2Fe^{2+} + Cl_2 \rightarrow 2Fe^{3+} + 2Cl^-$$

In the case of the oxidization with chlorine, the chloride ions dissolved in the solution are recovered in a concentration step and then recycled.

To the spent sulfuric acid after the oxidization treatment is then added hydrochloric acid, followed by the solvent extraction treatment. In this case, the molar fraction of chlorine ions in the spent sulfuric acid is adjusted so as to be at least 4 times that of iron ions in the liquid. As shown in FIG. 1, it has been known that the extraction rate of trivalent iron ions in this solution is drastically decreased if the concentration of hydrochloric acid is less than 3N (N=mol/l) and, therefore, the concentration of hydrochloric acid is desirably adjusted to be not less than 3N.

The hydrochloric acid which has been added is recovered in the concentration step, and can be recycled.

The organic solvents which can be used for extracting impure metal ions such as trivalent iron ions from the solution include acidic organophosphorus compounds, carboxylic acids, sulfonic acid, hydroxy oxime, oxine, beta-diketone, neutral phosphoric esters, phosphine oxide, ketones, alcohols, amines, and the like. These organic solvents can be used along or in the mixtures of two or more. In order to separate metal ions other than iron ions which are contained in a trace of amounts, it is very advantageous to jointly use several kinds of these solvents.

In this connection, benzene, chloroform, toluene, kerosine, n-hexane or the like may be utilized as a diluent to adjust the viscosity of the extracting agent. The choice of an appropriate diluent can improve the extracting ability of the organic solvent.

In carrying out this solvent extraction treatment, in order to separate trivalent iron ions and titanium ions respectively, the trivalent iron ions are first extracted from this solution with a ketone, an alcohol, a neutral phosphoric ester, or the like, and the titanium ions are then extracted with an acidic organophosphorus compound, a carboxylic acid, sulfonic acid, hydroxy oxime, or the like.

In order to preferentially extract the trivalent iron ions from the solution, for example, ketones are used to carry out the extraction. In this case, methyl isobutyl ketone can particularly be used for the preferential extraction of the trivalent iron ions, but hardly extracts the titanium ions. Subsequently, acidic organophosphorus compounds are utilized to extract the titanium ions from the solution from which the trivalent iron ions have been extracted. A preferable acidic organophosphorus compound is, di(2-ethylhexyl) phosphoric ester.

The trivalent iron ions extracted with methyl isobutyl ketone are stripped with water and recovered as the hydroxide thereof. After the recovery, iron oxides can be obtained by calcining. They can be used as coagulants or raw materials for ferrite. In the case of the back extraction of the trivalent iron ions, chlorine ions which are partially extracted together with the trivalent iron ions are also reversely extracted and are contained in the reversely extracted solution. The chloride ions can be recovered as hydrochloric acid by adding sulfuric acid to the solution to carry out substitution followed by concentration.

The titanium ions extracted with di(2-ethylhexyl) phosphoric ester are stripped with a hydrofluoric acid solution or an alkaline solution such as sodium hydroxide, and are recovered as the hydroxide thereof, etc. After the recovery, titanium oxide can be obtained by calcination. This can be used as a raw material for titanium.

In the present invention, the spent sulfuric acid from which impure metal ions such as iron ions have been removed is then recovered in two stages for concentration as a sulfuric acid having a concentration of not less than 80% by weight.

Iron ions, titanium ions, as well as scandium can be removed by the above-mentioned solvent extraction treatment, but the removal of manganese ions, aluminum, etc. is difficult. They remain in the solution in considerable amounts. They are deposited as the corresponding metal sulfates, after hydrochloric acid is recovered by concentrating the solution to 60–75% by weight of sulfuric acid, by allowing the solution to cool. In this case, manganese is removed as manganese sulfate monohydrate. Other metal ions contained in the solution in trace amounts are simultaneously removed as the corresponding metal sulfates. Subsequently, the concentration of the solution from which the metal sulfates are removed gives highly concentrated sulfuric acid having a concentration of sulfuric acid of not less than 80% by weight.

In the first stage for concentration, almost all of the hydrochloric acid can be recovered, and the recovered hydrochloric acid can be reused in the step for solvent extraction.

DETAILED DESCRIPTION OF THE PREFERRED EMBODIMENTS

Figure 1:
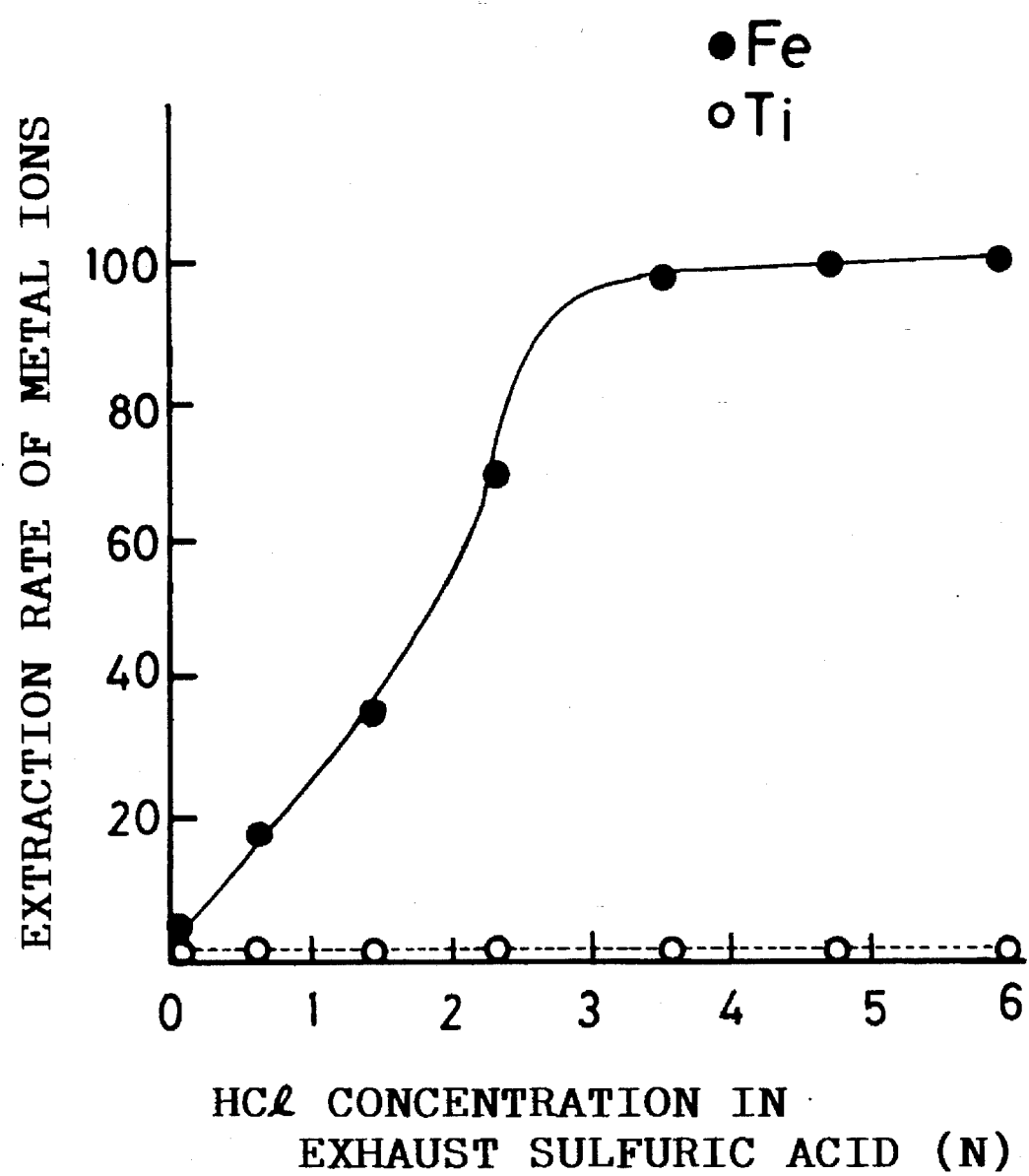
FIG. 1 is a drawing showing the relationship between the concentration of hydrochloric acid and the extraction ratios of iron ions and titanium ions, using methyl isobutyl ketone.
Figure 2:
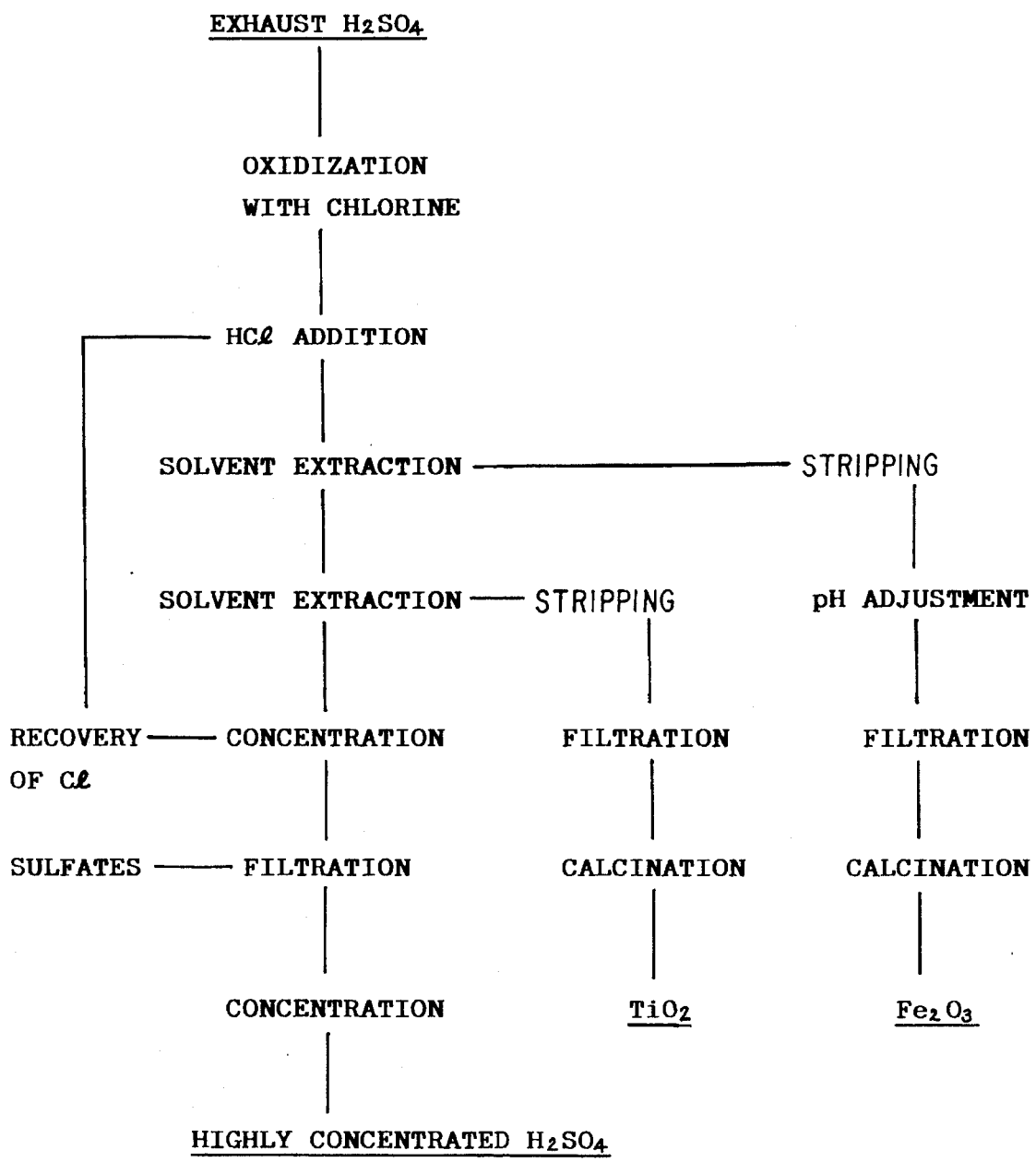
FIG. 2 is a flow chart showing the treating process of the present invention.

Now, the working examples of the present invention will be described, but, the present invention is not, of course, restricted to these examples.

EXAMPLE 1

Into 5 liters of a spent sulfuric acid comprised of 360 g/l of sulfuric acid, 1 g/l of trivalent iron ions, 38 g/l of bivalent iron ions, 2.9 g/l of titanium, and 5.3 g/l of manganese, which had been exhausted in a stage for producing titanium oxide was fed a chlorine gas in an amount 1.5 equivalents relative to the bivalent iron ions together with air to oxidize the bivalent iron ions to trivalent iron ions. This gave 5 liters of an oxidized solution comprised of 360 g/l of sulfuric acid, 39 g/l of trivalent iron ions, 0.0 g/l of bivalent iron ions, 2.9 g/l of titanium, 5.3 g/l of manganese and 25 g/l of chlorine.

To this solution were added 2.5 liters of concentrated hydrochloric acid to adjust the solution to about 4N hydrochloric acid solution. This gave 7.5 liters of a solution comprised of 240 g/l of sulfuric acid, 26 g/l of trivalent iron ions, 1.9 g/l of titanium, 3.5 g/l of manganese, and 158 g/l of chlorine. Subsequently, this solution was brought into contact with 10 liters of methyl isobutyl ketone, whereby trivalent iron ions were selectively extracted and removed. The resulting solution was then brought into contact with 10 liters of 1 mol/l solution of di(2-ethylhexyl) phosphoric acid in kerosine, whereby titanium ions were extracted. These solvent extraction treatments gave 7.5 liters of a solution comprised of 240 g/l of sulfuric acid, 0.01 g/l of trivalent iron ions, 0.03 g/l of titanium, 3.5 g/l of manganese, and 92 g/l of chlorine.

The trivalent iron ions extracted with methyl isobutyl ketone were reversely extracted with 10 liters of water to obtain an aqueous solution comprised of 19 g/l of iron and 49 g/l of chlorine, and recovered as hydroxide. After the recovery, about 270 g of iron was recovered as iron (III) oxide ($Fe_2O_3$) by calcination. The recovery was about 97%.

The titanium ions extracted with 1 mol/l solution of di(2-ethylhexyl) phosphoric acid in kerosine were reversely extracted with 10 liters of an aqueous 2 mol/l of sodium hydroxide solution, and the formed hydroxide was recovered, after which it was calcined to recover about 23 g of titanium (IV) oxide. The recovery was about 95%.

The solution which had been treated with solvent extraction was concentrated at about 120° C. and at 74 mmHg to sulfuric acid concentration of about 70% by weight to recover about 5.9 liters of hydrochloric acid (116 g/l as chlorine). The concentrated solution was allowed to cool, and about 70 g of deposited metal sulfates (chiefly manganese sulfate monohydrate) were separated. Thereafter, the solution was concentrated at about 180° C. and at 10 mmHg to recover 1.1 liters of about 82 wt % strength sulfuric acid solution having composition comprised of 1510 g/l of sulfuric acid, 0.00 g/l of trivalent iron ions, 0.04 g/l of titanium, 3.5 g/l of manganese and 0.02 g/l or less of chlorine. The recovery of sulfuric acid was about 92%.

EXAMPLE 2

7 liters of an spent sulfuric acid having composition comprised of 450 g/l of sulfuric acid, 1 g/l of trivalent iron ions, 42 g/l of divalent iron ions, 5.3 g/l of titanium, and 5.2 g/l of manganese were electrolytically oxidized to oxidize bivalent iron ions contained in the solution to trivalent iron ions. Subsequently, 3 liters of concentrated hydrochloric acid were added into it to adjust the solution to be about 3N solution, thereby obtaining 10 liters of a solution having composition comprised of 315 g/l of sulfuric acid, 30 g/l of trivalent iron ions, 0.0 g/l of divalent iron ions, 3.7 g/l of titanium, 3.6 g/l of manganese, and 128 g/l of chlorine.

Subsequently, this solution was brought into contact with 20 liters of methyl isobutyl ketone, whereby trivalent iron ions were selectively extracted and removed. The resulting solution was then brought into contact with 20 liters of 1 mol/l solution of di(2-ethylhexyl) phosphoric acid ester in kerosine, whereby titanium ions were extracted. These solvent extraction treatments gave 10 liters of solution having composition comprised of 315 g/l of sulfuric acid, 0.00 g/l of trivalent iron ions, 0.03 g/l of titanium, 3.6 g/l of manganese, and 50 g/l of chlorine.

The trivalent iron ions extracted with methyl isobutyl ketone were reversely extracted with 30 liters of water to obtain an aqueous solution having composition comprised of 10 g/l of iron and 26 g/l of chlorine, and recovered as hydroxide. After the recovery, about 420 g of iron was recovered as iron (III) oxide ($Fe_2O_3$) by calcination. The recovery was about 98%.

The titanium ions extracted with 1 mol/l solution of di(2-ethylhexyl) phosphoric acid ester in kerosine were reversely extracted with 20 liters of an aqueous 2 mol/l of sodium hydroxide solution, and the formed hydroxide was recovered, after which it was calcined to recover about 60 g of titanium (IV) oxide. The recovery was about 97%.

The solution which had been treated with solvent extraction was concentrated at about 110° C. and at 74 mmHg to a sulfuric acid concentration of about 65% by weight to recover about 6.9 liters of hydrochloric acid (72 g/l as chlorine). The concentrated solution was allowed to cool, and about 94 g of deposited metal sulfates (chiefly manganese sulfate monohydrate) were separated. Thereafter, the solution was concentrated at about 180° C. and at 10 mmHg to recover 2.0 liters of about 81 wt % strength sulfuric acid solution having composition comprised of 1490 g/l of sulfuric acid, 0.1 g/l of titanium, 3.2 g/l of manganese and 0.02 g/l or less of chlorine. The recovery of sulfuric acid was about 95%.

In addition to the above-mentioned examples, Table 1 shows the conditions of extraction rate of trivalent iron ions varied by the addition of hydrochloric acid. In the table, the volumetric ratio of the organic phase to the aqueous phase was 1:1, and all diluents except for methyl isobutyl ketone were diluted with kerosine. The conditions were the same as those of Example 2.

TABLE 1

| | Extraction Rate of Trivalent Iron Ions | | |
|---|---|---|---|
| Concentration of Extracting Agent | Aqueous Phase Extracting Agent | Only Oxidization (No HCl Addition) | Oxidization + HCl Addition (Oxidizin Liq.: Conc.HCl = 1:1) |
| Conc. | Methyl isobutyl ketone | <1% | 99% |
| 20 vol% | Tributyl phosphate | <1% | 93% |
| 20 vol% | 2-Ethylhexyl 2-ethyl-hexylphosphonic acid Trade Name: PC88A | 17% | 53% |
| 20 vol% | di (2-ethylhexyl) phosphoric acid Trade Name: DP8R | 14% | 38% |
| 20 vol% | bis (2,4,4-trimethyl-pentyl) phosphinic acid Trade Name: CYANEX 272 | 11% | 73% |
| 20 vol% | Tertiary Amine Trade Name: Alamine 336 | <1% | 94% |
| 20 vol% | Hydroxy oxime Trade Name:LIX63-70 | <1% | 58% |
| 20 vol% | β-diketone Trade Name: LIX54 | <1% | 7% |

What is claimed is:

1. A process for regenerating a spent sulfuric acid containing metal sulfates comprising:

oxidizing bivalent iron ions in a spent sulfuric acid into trivalent iron ions;

adding hydrochloric acid to said spent sulfuric acid to adjust the molar fraction of chloride ions in said spent sulfuric acid to at least 4 times that of iron ions;

subjecting said spent sulfuric acid to solvent extraction to remove iron ions;

concentrating said spent sulfuric acid, after solvent extraction, to a concentration of 60–75% by weight of sulfuric acid while separating hydrochloric acid;

separating deposited metal sulfates; and concentrating the separated solution of said spent sulfuric acid again to a concentration of not less than 80% by weight of sulfuric acid.

2. The process according to claim 1, further comprising performing solvent extraction of titanium ions following the solvent extraction of trivalent iron ions.

3. The process according to claim 2, wherein the solvent used in the step of solvent extraction of the titanium ions is selected from the group consisting of acidic organophosphorus compounds, carboxylic acid, sulfonic acid and hydroxy oxime.

4. The process according to claim 1, wherein the solvent used in the step of solvent extraction is selected from the group consisting of organophosphorus compounds, carboxylic acids, sulfonic acid, hydroxy oxime, oxine, beta-diketone, neutral phosphoric esters, phosphine oxide, ketones, alcohols and amines.

5. A process for regenerating a spent sulfuric acid containing metal sulfates comprising oxidizing bivalent iron ions, present in said spent sulfuric acid to trivalent in an amount sufficient to convert the iron values into an iron chloride complex and then solvent extracting said iron chloride complex.

6. The process according to claim 5, further comprising performing solvent extraction of titanium ions following the solvent extraction of trivalent iron ions.

* * * * *